United States Patent
Lee et al.

(10) Patent No.: US 11,351,976 B2
(45) Date of Patent: Jun. 7, 2022

(54) MOTOR TORQUE CONTROL METHOD FOR MOTOR-DRIVEN VEHICLE

(71) Applicants: Hyundai Motor Company, Seoul (KR); Kia Motors Corporation, Seoul (KR)

(72) Inventors: Jong Ho Lee, Gyeonggi-do (KR); Jung Woo Seo, Gyeonggi-do (KR); Eui Sun Hong, Chungcheongnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 263 days.

(21) Appl. No.: 16/693,234

(22) Filed: Nov. 23, 2019

(65) Prior Publication Data
US 2020/0307544 A1    Oct. 1, 2020

(30) Foreign Application Priority Data
Apr. 1, 2019    (KR) .......................... 10-2019-0038010

(51) Int. Cl.
*B60W 10/08*    (2006.01)
*B60W 10/10*    (2012.01)
(Continued)

(52) U.S. Cl.
CPC .......... *B60W 10/08* (2013.01); *B60W 10/10* (2013.01); *B60W 40/105* (2013.01);
(Continued)

(58) Field of Classification Search
CPC .... B60W 10/08; B60W 10/10; B60W 40/105; B60W 2050/0039; B60W 2710/083; B60W 2050/0026; B60W 2520/10; B60W 2520/28; B60W 2510/1005; B60W 30/18109; B60W 30/18027; B60W 20/17; B60W 2510/081; B60W 2540/10; B60W 2540/12; B60W 2510/083; B60W 10/18;
(Continued)

(56) References Cited

U.S. PATENT DOCUMENTS 5,819,197 A * 10/1998 Fiaschetti .............. G01M 15/11
                                                            701/110
5,821,720 A * 10/1998 Deng .................... B60W 10/08
                                                            318/630
(Continued)

*Primary Examiner* — Mary Cheung
(74) *Attorney, Agent, or Firm* — Fox Rothschild LLP

(57) ABSTRACT

A motor torque control method for a motor-driven vehicle is carried out when a vehicle reduces its speed to a low speed or is in a stopped state, gear backlash and torsion of a drivetrain are minimized, and thus impact on the drivetrain which may occur during starting or restarting of a vehicle is minimized. The motor control method includes determining whether vehicle speed is in a speed reducing state less than a set vehicle speed or in a stopped state; determining a required torque command, an anti-jerk torque, and an additional drivetrain arrangement torque for removing drivetrain backlash based on vehicle operation state information when the speed reducing state or the stopped state is determined; and determining a motor torque command by using the required torque command, the anti-jerk torque, and the drivetrain arrangement torque.

9 Claims, 5 Drawing Sheets

(51) Int. Cl.
　　　　*B60W 40/105*　　　(2012.01)
　　　　*B60W 50/00*　　　　(2006.01)
(52) U.S. Cl.
　　　　CPC .............. *B60W 2050/0026* (2013.01); *B60W 2050/0039* (2013.01); *B60W 2520/10* (2013.01); *B60W 2710/083* (2013.01)
(58) Field of Classification Search
　　　　CPC .. B60L 3/0007; B60L 3/0061; B60L 15/2009; B60L 15/2054; B60L 2240/423; B60L 2240/12; B60Y 2200/91; B60Y 2300/18025; Y02T 10/72
　　　　See application file for complete search history.

(56) References Cited

U.S. PATENT DOCUMENTS

| | | | | |
|---|---|---|---|---|
| 2016/0377171 | A1* | 12/2016 | Ryu | B60K 17/02 74/409 |
| 2017/0282920 | A1* | 10/2017 | Ortseifen | B60W 30/20 |
| 2018/0015926 | A1* | 1/2018 | Cunningham | B60W 50/10 |
| 2020/0165987 | A1* | 5/2020 | Cunningham | F02D 29/02 |
| 2020/0208521 | A1* | 7/2020 | Caldwell | F01B 1/0675 |
| 2020/0269846 | A1* | 8/2020 | Engman | B60W 10/08 |

* cited by examiner

MOTOR TORQUE CONTROL METHOD FOR MOTOR-DRIVEN VEHICLE

CROSS REFERENCE TO RELATED APPLICATION

The present application claims under 35 U.S.C. § 119(a) the benefit of Korean Patent Application No. 10-2019-0038010, filed Apr. 1, 2019, the entire contents of which are incorporated by reference herein.

BACKGROUND

(a) Technical Field

The present disclosure relates generally to a motor torque control method for a motor-driven vehicle, more particularly, to the motor torque control method in which when a vehicle reduces its speed to a low speed or is in a stopped state, gear backlash and torsion of a drivetrain are minimized, and thus impact on the drivetrain which may occur during starting or restarting of the vehicle is minimized.

(b) Description of the Related Art

Recently, due to global environmental regulations, environmentally-friendly vehicles have come into wider use.

The environmentally-friendly vehicles include a hybrid electric vehicle (HEV), an electric vehicle (EV), and a fuel cell electric vehicle (FCEV).

The environmentally-friendly vehicles include motor-driven electric vehicles, that is, all motor-driven vehicles, in which a motor is controlled by a driver such as by accelerator pedal manipulation and brake pedal manipulation.

In a normal vehicle, a driving manipulation state of a driver may be detected by a sensor, an accelerator pedal manipulation state may be detected by an accelerator pedal position sensor, (hereinafter referral to as "APS"), and a brake pedal manipulation state may be detected by a brake pedal sensor (hereinafter referred to as "BPS").

A signal value (hereinafter referred to as an "APS value") output from the APS and a signal value (hereinafter referred to as a "BPS value") output from the BPS indicate the driving manipulation state of the driver and may be variable values reflecting the driver's demands in controlling a motor.

In addition, in the motor-driven vehicle, a motor torque command for a motor control is determined to be a sum of a required torque command and anti-jerk torque for vibration reduction according to driver demand as provided in Equation 1 below.

Motor torque command=Required torque command+ Anti-jerk torque. [Equation 1]

The anti-jerk torque is a torque preventing vibration (shock & jerk) of a drivetrain which may occur when increasing/decreasing vehicle speed.

In Equation 1, the required torque command is determined based on the APS value and the BPS value reflecting the driver's demands and vehicle speed, and the anti-jerk torque is calculated based on the vehicle speed and motor speed.

When the anti-jerk torque is calculated, the vehicle speed may refer to wheel speed detected by the sensor. More particularly, the vehicle speed may refer to an equivalent wheel speed, changed to motor speed by using a gear ratio (the gear ratio between a motor and a wheel) corresponding to a present gear level of the transmission, that is, it may refer to a model speed.

In this case, the anti-jerk torque may be determined by a value corresponding to deviation between the model speed and actual speed of a motor.

Meanwhile, the motor-driven vehicle operates by using a motor during stopping or initial start, and in some vehicles, start impact occurs according to start time after vehicle stopping.

This is because gear backlash and torsion occur in the drivetrain due to applied motor torque (for example, anti-jerk torque) during vehicle stopping.

Normally, the applied motor torque during vehicle stop is determined by the anti-jerk torque alone without the required torque command in Equation 1.

In the motor-driven vehicle, although a vehicle driving source (an engine and the motor, or the motor) and the drivetrain including the transmission (or a reduction gear), a drive shaft, and a drive wheel may be referral to as a rigid body rotating integrally with each other, the drivetrain between the vehicle driving source and the drive wheel may have torsion occurring during actual driving.

Particularly, in a situation in which drive torque changes radically and momentarily, for example, in a situation in which a driver often presses a gas pedal momentarily and quickly or in a situation in which a driver releases a gas pedal abruptly and quickly, torsion of the drivetrain may occur.

Accordingly, when an abrupt manipulation or driving of a vehicle by a driver is input (for example, when there is an abrupt gas pedal manipulation), noise and vibration may occur due to the gear backlash and torsion of the drivetrain.

Noise and vibration in the drivetrain are usually caused by backlash occurring due to tolerances between engaged gears of the drivetrain and by torsion of the drive shaft, except for disturbance, and to solve the noise and vibration problem in the drivetrain, anti-jerk control is usually performed in the motor-driven vehicle.

When the anti-jerk control is not performed and only the required torque command is used to determine and use the motor torque command without the anti-jerk torque in Equation 1, a vehicle has an irregular start impact occurrence when the vehicle is reducing speed to low speed or when the vehicle restarts after stopping.

However, since the wheel speed detected by the sensor in the low speed is not accurate, the anti-jerk torque calculated by using the wheel speed is also inaccurate. Accordingly, although the anti-jerk control is performed in the vehicle, noise and vibration are not effectively removed when the vehicle is reducing its speed to a low speed or when the vehicle restarts after stopping.

SUMMARY

Accordingly, the present disclosure proposes a motor torque control method for a motor-driven vehicle, in which when a vehicle is reducing its speed to a low speed or is in a stopped state, gear backlash and torsion of a drivetrain are minimized, and thus impact on the drivetrain which may occur during starting or restarting of a vehicle is minimized.

In order to achieve the above objects, according to one aspect of the present disclosure, there is provided a motor control method for a motor-driven vehicle, the method including: determining, by a controller, whether a vehicle speed is in a speed reducing state less than a set vehicle speed or in a stopped state when a brake pedal is manipulated by a driver; determining, by the controller, a required torque command, an anti-jerk torque, and an additional drivetrain arrangement torque for removing drivetrain backlash based on vehicle operation state information collected from a vehicle when the controller determines the speed reducing state or the stopped state; and determining, by the controller, a motor torque command by using the required torque command, the anti-jerk torque, and the drivetrain arrangement torque, which are determined.

Here, the motor torque command may be determined to be a sum of the required torque command, the anti-jerk torque, and the drivetrain arrangement torque, which are determined.

In addition, in the determining of the drivetrain arrangement torque, the controller may determine the drivetrain arrangement torque based on an arrangement torque applied time which is time passing from initial time at which present vehicle speed and the drivetrain arrangement torque as the vehicle operation state information are applied.

Further, initialization of the arrangement torque applied time which determines and remembers time at which the controller determines the speed reducing state or the stopped state as the initial time at which the drivetrain arrangement torque is applied may be performed.

Additionally, when the controller determines that a transmission gear is changed to a forward gear or a rearward gear, initialization of the arrangement torque applied time which determines and remembers changed time of the gear as the initial time at which the drivetrain arrangement torque is applied may be performed.

In addition, the controller may determine basic arrangement torque corresponding to the present vehicle speed by using setting information, determine a torque ratio corresponding to the arrangement torque applied time by using the setting information, and determine the drivetrain arrangement torque by multiplying the basic arrangement torque to the torque ratio.

Further, the setting information used to determine the basic arrangement torque may be a map in which the basic arrangement torque is set to be a value according to the vehicle speed, wherein the basic arrangement torque may be set to decrease as the vehicle speed increases.

Additionally, the setting information used to determine the torque ratio may be a map in which the torque ratio is set to be a value according to the arrangement torque applied time, wherein the torque ratio may be set to decrease as the arrangement torque applied time increases.

In addition, the motor control method for a motor-driven vehicle according to the present disclosure may further include: determining, by the controller, a forward gear state or a rearward gear state of a transmission, wherein in the determining of the motor torque command, the controller may determine the motor torque command in a following equation by using information of the forward gear state or the rearward gear state of the transmission.

$$F_{out} = F_{cmd} + S \times \max(0, F_{anti} + F_{align}).$$ Equation:

Here, $F_{out}$ may refer to the motor torque command, $F_{cmd}$ may refer to the required torque command, $F_{anti}$ refers to the anti-jerk torque, $F_{align}$ may refer to the drivetrain arrangement torque, max $(0, F_{anti} + F_{align})$ may refer to a larger value of 0 and a sum of $F_{anti}$ and $F_{align}$, and S as a value determined according to the forward gear state or the rearward gear state of the transmission may be +1 in case of a forward gear and −1 in case of a rearward gear.

Accordingly, according to the motor torque control method for a motor-driven vehicle of the present disclosure, the drivetrain arrangement torque is additionally applied to motor torque while anti-jerk control is maintained, whereby gear backlash and torsion of the drivetrain and start impact are minimized.

Particularly, when a vehicle stops, the method of the present disclosure efficiently arranges the drivetrain, thus minimizing start impact irrespective of start time.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
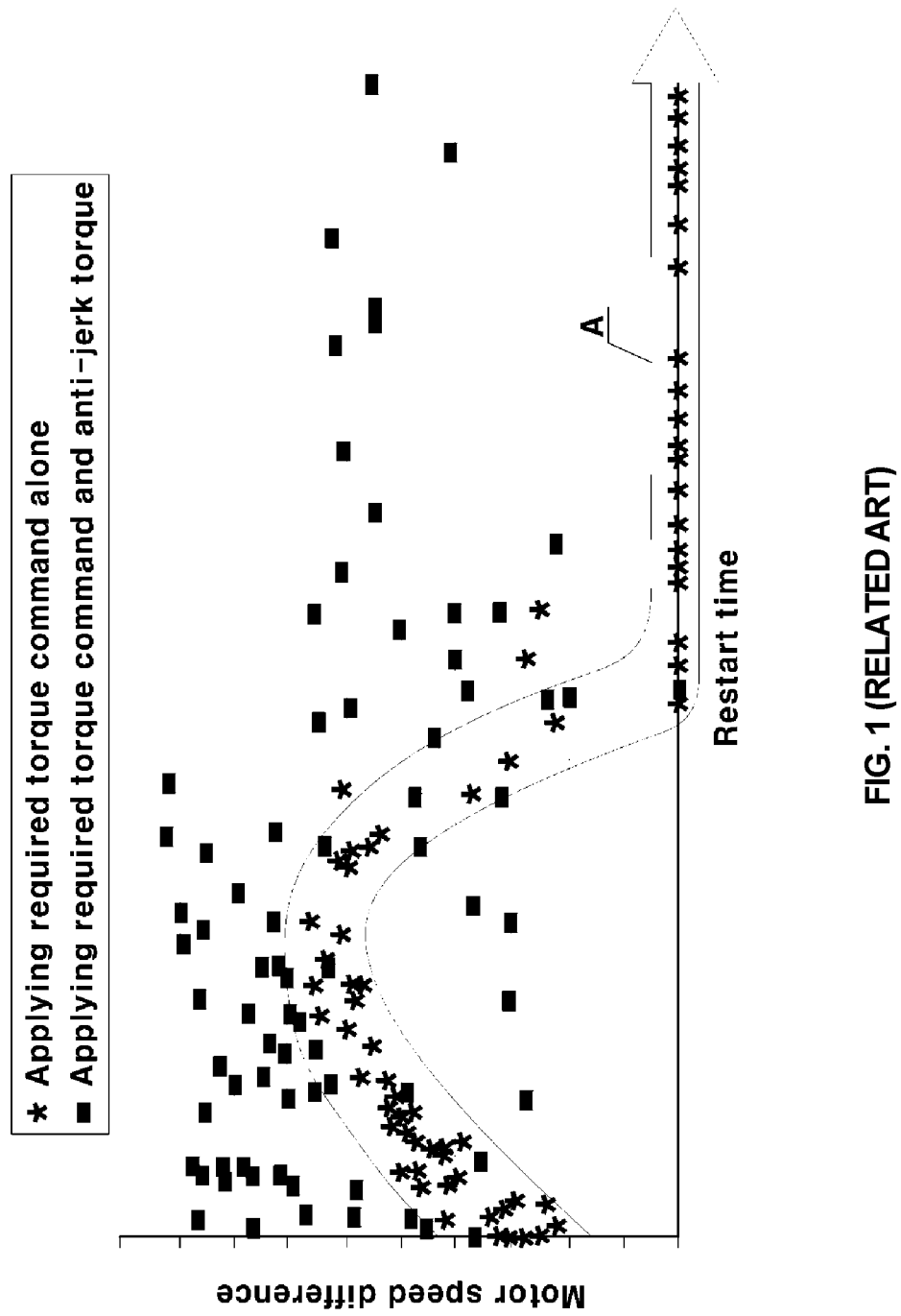
FIGS. 1 and 2 (RELATED ART) are graphs showing comparisons of start impacts according to restart times after a vehicle stops.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, an embodiment of the present disclosure will be described in detail with reference to the accompanying drawings such that those skilled in the art can efficiently perform the embodiment of the present disclosure. However, the present disclosure is not limited to the embodiment, and may be variously realized.

As an example of known anti-jerk control, motor speed, that is, model speed ($\omega_{model}$) of a motor may be obtained by the wheel speed detected by a sensor, and anti-jerk torque may be calculated based on deviation ($\Delta\omega$) between the model speed ($\omega_{model}$) and actual speed ($\omega_{actual}$) of the motor.

That is, a motor vibration level may be obtained by deviation ($\Delta\omega=\omega_{model}-\omega_{sctual}$) between the model speed and the actual speed of the motor. In this case, the anti-jerk torque is determined to be a torque value corresponding to the motor vibration level.

In determining a motor torque command ($F_{out}$) by Equation 1, a required torque command ($F_{cmd}$) is fixed to be "0" in a low speed of a predetermined speed or less. Accordingly, the motor torque command is determined by using only the anti-jerk torque ($F_{anti}$) for motor vibration reduction.

When a vehicle is reducing its speed to a low speed or stop, a motor torque direction is changed by the anti-jerk torque and accordingly, gear backlash and torsion of a drivetrain occur, whereby start impact occurs when restarting after a stop.

FIG. 1 is a graph showing a comparison of the start impacts according to restart times after vehicle stopping and showing motor speed differences according to different restart times, and shows the comparison of states of the start impacts (sudden rises in the motor speed) according to whether the anti-jerk torque is applied.

As shown in FIG. 1, a vehicle in which the anti-jerk control is not performed, that is, a vehicle in which only the required torque command according to the driver's demands in Equation 1 is taken as the motor torque command so as to perform motor torque control without applying the anti-jerk torque (the anti-jerk torque=0), has irregular start impacts occurring even during restart after a vehicle stop.

Referring to FIG. 1, when the anti-jerk torque is not performed, the motor speed differences indicating the start impacts, that is, motor speed difference values according to the restart times are seen to be irregularly scattered around.

On the contrary, in a vehicle having the anti-jerk control performed, that is, in a vehicle to which the anti-jerk torque is applied to have the motor torque command, which is the sum of the required torque command and the anti-jerk torque in Equation 1, regular start impacts may occur during restart after stopping.

That is, in FIG. 1, the start impacts (motor speed difference values) according to restart times show the tendency of following a curve "A".

Figure 2:
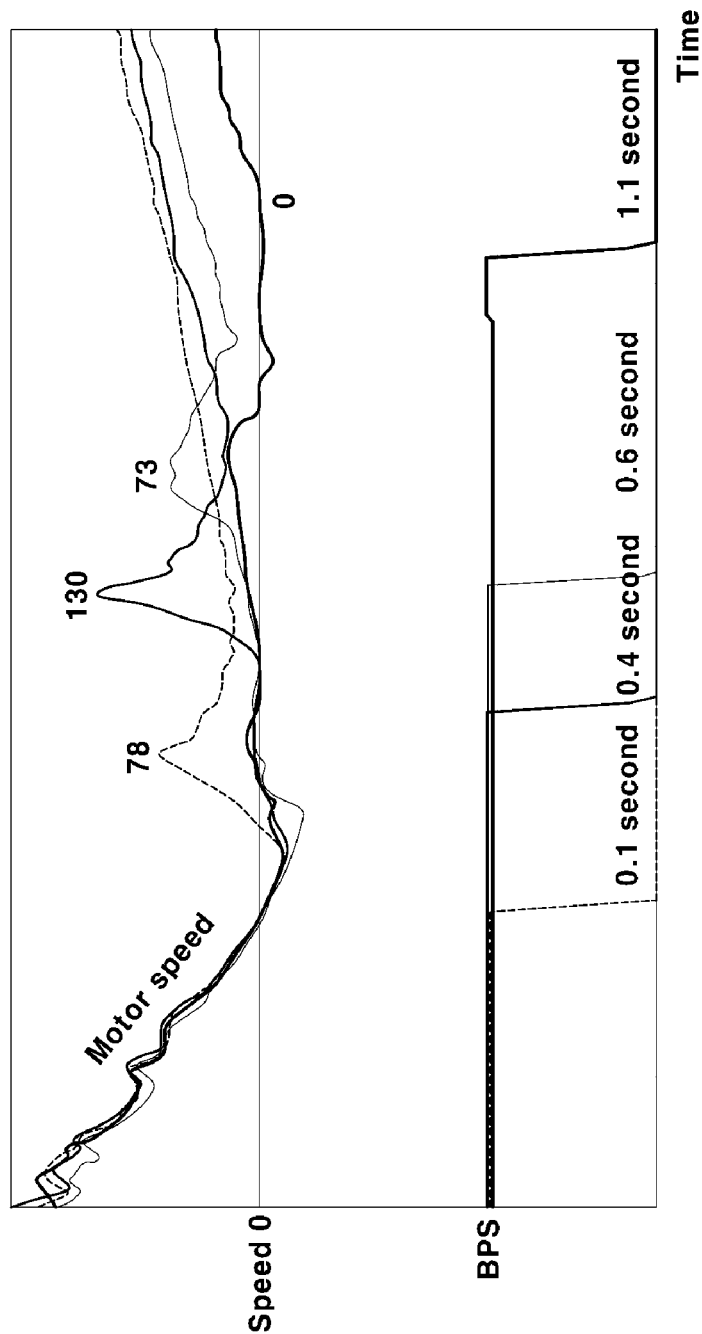

In addition, FIG. 2 shows the comparison of the start impacts (the sudden rises in motor speed) according to restart times after stops, and compares various cases in which a vehicle restarts by a driver releasing a brake pedal after the vehicle stops by the driver pressing the brake pedal, and shows an example of a vehicle to which the anti-jerk torque is applied.

The brake pedal is pressed by the same strength in all the cases during vehicle stops (the same BPS values), and the time (restart time) at which a driver releases the brake pedal to restart after the vehicle stops by decreasing motor speed is divided into 0.1 second, 0.4 second, 0.6 second, and 1.1 seconds so as to compare the start impacts.

Referring to motor speed curves of FIG. 2, when a driver releases a brake pedal in 0.1 second after the motor speed is gradually decreased by the driver pressing the brake pedal and a vehicle stops, the motor speed rises by 78 rpm from a lowest value to a highest value (a motor speed rise amount of Δ78 rpm).

In addition, when a driver releases the brake pedal after 0.4 second, the motor speed rose by 130 rpm (a motor speed rise amount Δ130 rpm), and when a driver releases the brake pedal after 0.6 second, the motor speed rose by 73 rpm (a motor speed rise amount of Δ73 rpm).

In FIG. 2, when the driver releases the brake pedal after stopping the vehicle while the anti-jerk torque is applied, the motor speed rises to the highest value as illustrated by the curves in the drawing, which refers to the start impact.

Combining the results of FIGS. 1 and 2, in the vehicle applying the anti-jerk torque, regularity may be seen between start impact states (that is, motor speed difference values of FIG. 1 and motor speed rise amounts of FIG. 2) and times (that is, restart times) on which the driver releases the brake pedal.

In addition, it may be known that when vehicle speed is low, only the anti-jerk control does not effectively remove the start impacts; in a condition in which restart time is at least a predetermined time, the start impacts do not occur significantly; and during a vehicle stop, the motor torque plays an important role in reducing the start impacts.

When the motor torque command is determined by considering the described facts, the present disclosure presents a new torque compensation concept that a drivetrain arrangement torque is additionally used in cooperation with existing anti-jerk torque.

Figure 3:
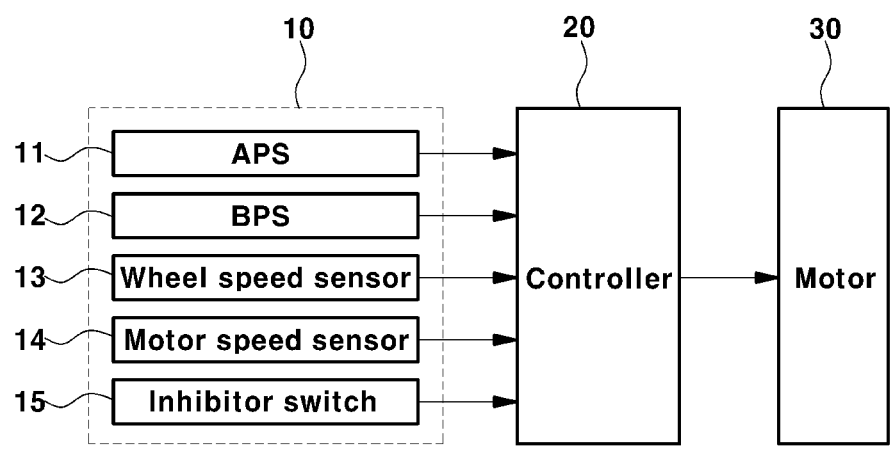
FIG. 3 is a block diagram showing the configuration of an apparatus performing motor torque control according to the present disclosure.
Figure 4:
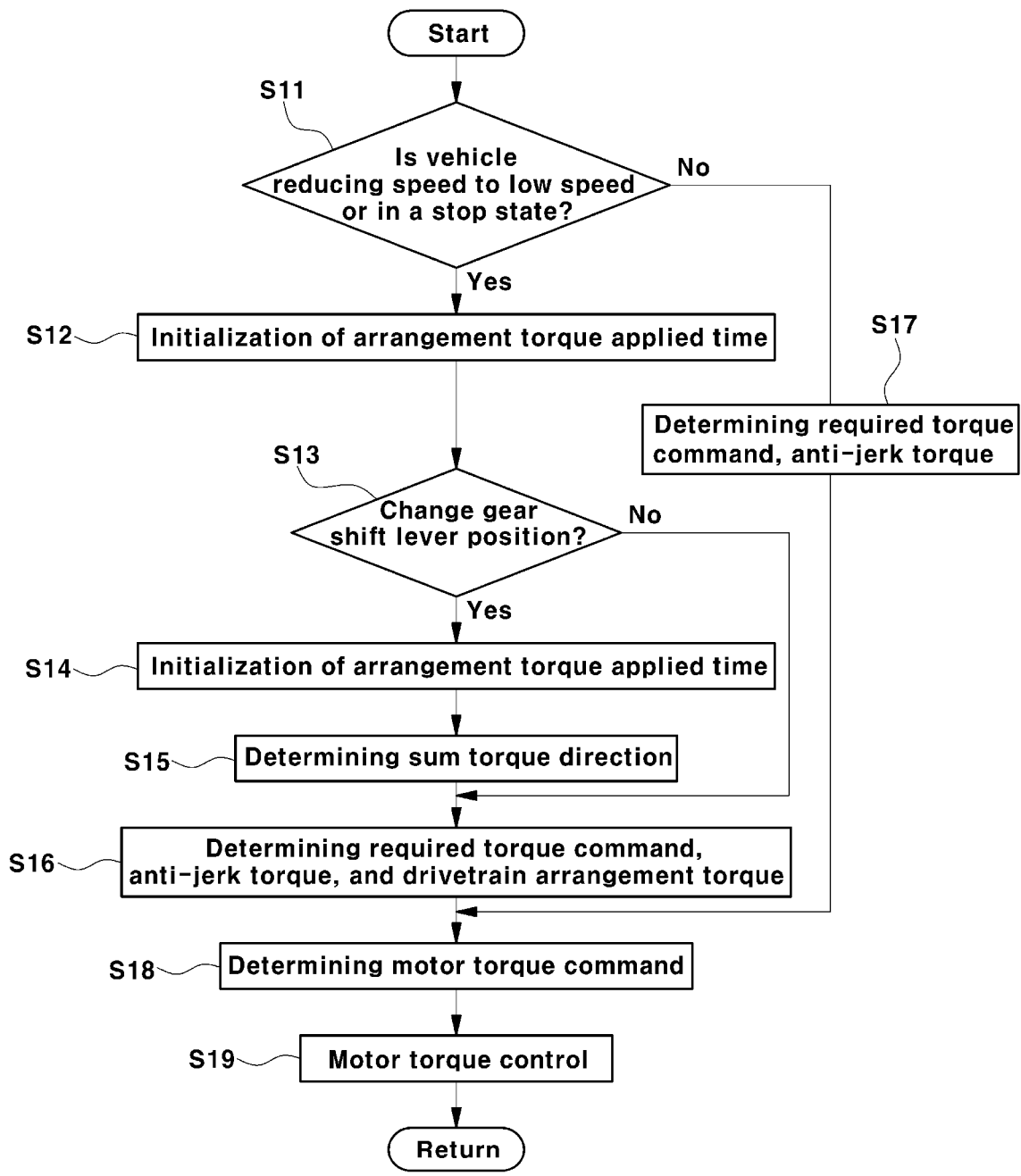
FIG. 4 is a flowchart showing a motor torque control method according to the present disclosure.

Hereinbelow, an embodiment of the present disclosure will be described referring to the drawings. FIG. 3 is a block diagram showing the configuration of an apparatus performing motor torque control according to the present disclosure, and FIG. 4 is a flowchart showing a motor torque control method according to the present disclosure.

Figure 5:
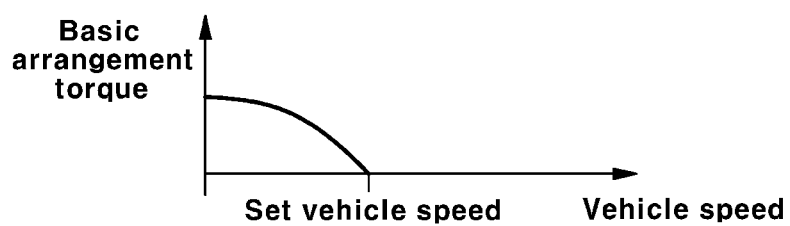
FIGS. 5 and 6 are graphs showing setting information so as to calculate a drivetrain arrangement torque in the motor torque control method according to the present disclosure.
Figure 6:
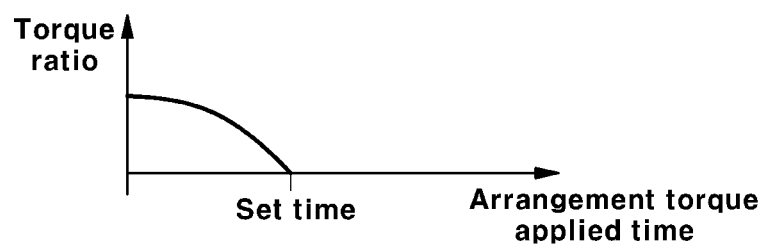

In addition, FIGS. 5 and 6 are graphs showing setting information so as to calculate the drivetrain arrangement torque in the motor torque control method according to the present disclosure.

The present disclosure relates to a motor control method for a motor-driven vehicle, and the motor torque command for the motor torque control is determined based on vehicle operation state information collected by a vehicle, and a drive motor of the vehicle is controlled according to the determined motor torque command.

Seeing the configuration of the apparatus performing the motor torque control according to the present disclosure, as is shown in FIG. 3, the apparatus includes an operation information detection part 10 detecting the vehicle operation state information, and a controller 20 determines the motor torque command based on the vehicle operation state information detected by the operation information detection part 10.

In addition, the controller 20 controls the operation of the motor 30 according to the motor torque command determined based on the vehicle operation state information.

In the present disclosure, the vehicle operation state information may include information detected by the sensor, and more particularly, may include a gas pedal detection value, a brake pedal detection value, the vehicle speed, the wheel speed, and the motor speed.

Here, the gas pedal detection value and the brake pedal detection value may be detected by APS 11 and BPS 12, respectively, and in the following description, the gas pedal detection value and the brake pedal detection value are referred to as "APS value" and "BPS value", respectively.

In the present disclosure, the sensor of detecting the vehicle speed and the wheel speed may be a normal wheel speed sensor 13, and it is known that vehicle speed information and wheel speed information are obtained from a signal of the wheel speed sensor 13.

For example, the wheel speed information of a drive wheel may be obtained from the signal of the wheel speed sensor 13, and further, when average speed of a vehicle wheel is obtained from signals of a plurality of wheel speed sensors 13 provided in each vehicle wheel, the vehicle speed may be obtained from the average speed of the vehicle wheel.

Further, in the present disclosure, the sensor 14 of detecting the motor speed (that is, a motor speed sensor) may be a normal resolver provided in a motor in an environmentally-friendly vehicle, and present motor speed information may be obtained from a signal of the resolver.

Referring to FIG. 3, the operation information detection part 10 is intended to detect the vehicle operation state information, and includes APS 11, BPS 12, the wheel speed sensor 13, the motor speed sensor 14, and may further include an inhibitor switch 15 as described hereinafter.

Meanwhile, when calculating the motor torque command, the controller 20 basically determines the motor torque command by summing the required torque command, the anti-jerk torque, and the drivetrain arrangement torque as in Equation 2 described below.

Motor torque command=Required torque command+ Anti-jerk torque+Drivetrain arrangement torque  [Equation 2]

The present disclosure is not different compared to the conventional method in that the required torque command ($F_{cmd}$) and the anti-jerk torque ($F_{anti}$) are determined based on the vehicle operation state information.

That is, in the present disclosure, the required torque command ($F_{cmd}$) may be determined based on the APS value and the BPS value reflecting the driver's demands and the vehicle speed of the vehicle operation state information detected by the operation information detection part 10, and the anti-jerk torque ($F_{anti}$) may be determined based on the wheel speed of the drive wheel and the motor speed.

When the anti-jerk torque ($F_{anti}$) is determined, the motor speed, that is, the model speed ($\omega_{model}$) of a motor may be determined by the wheel speed detected by the wheel speed sensor 13, and the anti-jerk torque may be calculated based on deviation ($\Delta_w$) between the model speed ($\omega_{model}$) and the actual speed ($\omega_{actual}$) of the motor.

That is, the motor vibration level may obtained by using deviation ($\Delta_w=\omega_{model}-\omega_{actual}$) between the model speed and the actual speed of the motor, and the anti-jerk torque ($F_{anti}$) may be determined by the obtained motor vibration level.

The drivetrain arrangement torque ($F_{align}$) is a torque of removing gear backlash during vehicle start after vehicle stopping, and may be determined based on the present vehicle speed and an arrangement torque applied time when a vehicle is reducing speed to a low speed state in which a present vehicle speed is less than a set vehicle speed by a driver pressing a brake pedal or when a vehicle stops (the vehicle speed<the set vehicle speed and BPS value>0).

The drivetrain arrangement torque ($F_{align}$) may be calculated by Equation 3 described below.

Drivetrain arrangement torque=Basic arrangement torque×Torque ratio  [Equation 3]

Here, the basic arrangement torque may be a torque determined based on the present vehicle speed, and the controller 20 is set to determine the basic arrangement torque by using the present vehicle speed based on the pre-stored setting information.

The setting information may be a data predefining a correlation between the vehicle speed and the basic arrangement torque, and the data is input to and stored in advance in the controller 20 and is used to determine the basic arrangement torque.

The data, which is the setting information, may be a map, a table, or a mathematical formula, etc., and FIG. 5 illustrates a torque map in which the basic arrangement torque is set to be a value according to the vehicle speed.

Referring to FIG. 5, it is seen that the basic arrangement torque is set to be the value according to the vehicle speed of the set vehicle speed or less.

In addition, FIG. 5 shows that as the vehicle speed increases, the basic arrangement torque may be set to decrease, and according to the setting information of FIG. 5, when a vehicle reduces speed to a low speed state, the basic arrangement torque increases as the vehicle speed decreases.

The torque ratio is a kind of a factor value determined based on the arrangement torque applied time. Here, the arrangement torque applied time refers to an initial time at which the drivetrain arrangement torque is applied.

In the present disclosure, the arrangement torque applied time may be initialized at time at which the vehicle speed becomes less than the set vehicle speed while the vehicle speed is reduced by brake pedal manipulation of a driver.

In addition, as described hereinafter, the arrangement torque applied time may be initialized at time at which a driver changes a gear shift lever position to a forward gear (a D gear) or a rearward gear (an R gear).

Initialization of the arrangement torque applied time refers to determining and remembering a time of the initialization as the initial time at which the drivetrain arrangement torque is applied.

In addition, in the present disclosure, the controller 20 may be provided to determine the torque ratio by using the arrangement torque applied time based on the pre-stored setting information, and the setting information may be the data predefining a correlation between the arrangement torque applied time and the torque ratio, wherein the data is used to determine the torque ratio by being pre-input to and pre-stored in the controller 20.

The data, which is the setting information for determining the torque ratio, may be a map, a table, or a mathematical formula, etc., and FIG. 6 illustrates a map in which the torque ratio is set to be a value according to the arrangement torque applied time.

Referring to FIG. 6, the torque ratio is seen to be set as the value according to the arrangement torque applied time, and the arrangement torque applied time is seen to be defined as time within set time.

In addition, as shown in FIG. 6, as the arrangement torque applied time increases, the torque ratio may be set to decrease, and according to the setting information of FIG. 6, as the arrangement torque applied time passes, the torque ratio decreases.

Accordingly, even in the same vehicle speed condition, as the arrangement torque applied time passes, the drivetrain arrangement torque is gradually decreased.

Finally, the controller 2 calculates the drivetrain arrangement torque ($F_{align}$) by multiplying the basic arrangement torque to the torque ratio as in Equation 3 when the basic arrangement torque and the torque ratio are obtained by maps as in FIGS. 5 and 6, and next, calculates the motor torque command by summing the calculated drivetrain arrangement torque, the required torque command, and the anti-jerk torque as in Equation 2.

Accordingly, in the present disclosure, the anti-jerk torque is applied as the conventional technology, and the drivetrain arrangement torque is additionally applied newly, whereby reversely-directed torque application is prevented so as to reduce impact during vehicle start.

Meanwhile, when the drivetrain arrangement torque ($F_{align}$) and the anti-jerk torque ($F_{anti}$) become negative values, backlash may occur, and accordingly, fixing a sum torque in a positive direction is necessary.

Further, so as to prevent backlash occurrence, motor torque of a direction contrary to a driving direction of a vehicle is required to be limited in an applying condition of the drivetrain arrangement torque.

Accordingly, in the exemplary embodiment of the present disclosure, the controller 20 may additionally use forward/rearward gear information as the vehicle operation state information, and the motor torque command may be calculated according to a forward gear state or a rearward gear state as in Equation 4 below.

$$F_{out} = F_{cmd} + S \times \max(0, F_{anti} + F_{align}) \quad \text{[Equation 4]}$$

Here, S is a value determining a direction of the sum torque of the anti-jerk torque and the drivetrain arrangement torque and determined according to the forward gear state or the rearward gear state, and is determined to be +1 when the gear of the transmission is in the forward gear (the D gear) and to be −1 when the gear is in the rearward gear (the R gear).

Accordingly, when the forward/rearward gear information is additionally used, as shown in FIG. 3, the operation information detection part 10 may further include the inhibitor switch 15, which is a gear shift detection part, and the controller 20 determines whether the gear shift lever position is in the forward gear (D gear) or in the rearward gear (the R gear) by receiving a signal of the inhibitor switch 15 and determines an S value.

In Equation 4, "max (0, $F_{anti}$, $+F_{align}$)" is intended to fix the sum torque of the drivetrain arrangement torque ($F_{align}$) and the anti-jerk torque ($F_{anti}$) in the positive direction, and defines a larger value of 0 and the sum torque ($F_{anti} + F_{align}$).

Hereinbelow, a motor torque control process according to the present disclosure will be described step by step referring to FIG. 4.

First, the controller 20 determines whether a predetermined vehicle speed condition is satisfied in a state in which a driver presses a brake pedal, that is, in a brake-on state.

That is, the controller determines whether a vehicle is reducing speed to a low speed state in which the vehicle speed is less than the set vehicle speed or is in a stopped state while the vehicle is in the brake-on state by using BPS value and the vehicle speed of the vehicle operation state information at S11.

Here, when the vehicle is reducing speed to the low speed state or is in the stopped state (the vehicle speed<the set vehicle speed and BPS value>0), the controller 20 initializes the arrangement torque applied time at the time of state entrance at S12, and next determines whether the gear shift lever position is changed at S13.

When the gear shift lever position is changed to the D gear or the R gear, the controller 20 initializes the arrangement torque applied time again at S14, and next, determines the S value indicating the direction of the sum torque of the anti-jerk torque ($F_{anti}$) and the drivetrain arrangement torque ($F_{align}$) at S15.

At S13, when the gear shift lever position is not changed, the controller 20 determines the S value indicating the direction of the sum torque of the anti-jerk torque ($F_{anti}$) and the drivetrain arrangement torque ($F_{align}$) without additional initialization of the arrangement torque applied time.

In addition, the controller 20 determines the required torque command ($F_{cmd}$), the anti-jerk torque ($F_{anti}$), and the drivetrain arrangement torque ($F_{align}$) based on the vehicle operation state information detected by the operation information detection part 10 at S16.

In this case, after the basic arrangement torque according to the present vehicle speed and the torque ratio according to the arrangement torque applied time are determined, the drivetrain arrangement torque ($F_{align}$) is determined according to Equation 3.

Next, the controller 20 determines the motor torque command ($F_{out}$) as in Equation 4 by using the required torque command ($F_{cmd}$), the anti-jerk torque ($F_{anti}$), the drivetrain arrangement torque ($F_{align}$), and the S value indicating the direction of the sum torque at S18, and controls the motor torque according to the determined motor torque command at S19.

In addition, at S11, when a vehicle is not reducing speed or is not in the stopped state, the controller 20 determines the required torque command ($F_{cmd}$) and the anti-jerk torque ($F_{anti}$) in the same previous way at S17; determines the motor torque command ($F_{out}$) by using a sum of the $F_{cmd}$ and the $F_{anti}$ at S18; and controls the motor torque according to the determined motor torque command at S19.

Accordingly, the motor torque control method according to the present disclosure, the drivetrain arrangement torque is additionally applied to motor torque while anti-jerk control is maintained, whereby gear backlash and torsion of the drivetrain and the start impact are minimized.

Particularly, when a vehicle stops, the method of the present disclosure efficiently arranges the drivetrain, thus minimizing start impact irrespective of start time.

Although the embodiment of the present disclosure has been described for illustrative purposes, claims of the present disclosure are not limited to only the embodiment set forth herein, and those skilled in the art will appreciate that various modifications, additions and substitutions are possible, without departing from the scope and spirit of the disclosure as disclosed in the accompanying claims.

What is claimed is:

1. A motor control method for a motor-driven vehicle, the method comprising:
   determining, by a controller, whether a vehicle speed is in a speed reducing state less than a set vehicle speed or in a stopped state when a brake pedal is manipulated by a driver;
   determining, by the controller, a required torque command, an anti-jerk torque, and an additional drivetrain arrangement torque for removing drivetrain backlash based on vehicle operation state information collected from a vehicle when the controller determines the speed reducing state or the stopped state;

determining, by the controller, a motor torque command by using the required torque command, the anti-jerk torque, and the drivetrain arrangement torque; and controlling, by the controller, the motor-driven vehicle according to the determined motor torque command.

2. The method of claim 1, wherein the motor torque command is determined to be a sum of the required torque command, the anti jerk torque, and the drivetrain arrangement torque.

3. The method of claim 1, wherein the controller determines the drivetrain arrangement torque based on an arrangement torque applied time which is an initial time at which a present vehicle speed and the drivetrain arrangement torque as the vehicle operation state information are applied.

4. The method of claim 3, wherein initialization of the arrangement torque applied time is performed so as to determine a time at which the controller determines the speed reducing state or the stopped state.

5. The method of claim 3, wherein when the controller determines that a transmission gear is changed to a forward gear or a rearward gear, initialization of the arrangement torque applied time is performed.

6. The method of claim 3, wherein the controller determines a basic arrangement torque corresponding to the present vehicle speed by using setting information, determines a torque ratio corresponding to the arrangement torque applied time by using the setting information, and determines the drivetrain arrangement torque by multiplying the basic arrangement torque to the torque ratio.

7. The method of claim 6, wherein the setting information used to determine the basic arrangement torque is a map in which the basic arrangement torque is set to be a value according to the vehicle speed, wherein the basic arrangement torque is set to decrease as the vehicle speed increases.

8. The method of claim 6, wherein the setting information used to determine the torque ratio is a map in which the torque ratio is set to be a value according to the arrangement torque applied time, wherein the torque ratio is set to decrease as the arrangement torque applied time increases.

9. The method of claim 1, further comprising:

determining, by the controller, a forward gear state or a rearward gear state of a transmission, wherein in determining of the motor torque command, the controller determines the motor torque command based on a following equation by using information of the forward gear state or the rearward gear state of the transmission:

$$F_{out} = F_{cmd} + S \times \max(0, F_{anti} + F_{align}),$$

wherein $F_{out}$ refers to the motor torque command, $F_{cmd}$ refers to the required torque command, $F_{anti}$ refers to the anti-jerk torque, $F_{align}$ refers to the drivetrain arrangement torque, max $(0, F_{anti} + F_{align})$ refers to a larger value of 0 and a sum of $F_{anti}$ and $F_{align}$, and S as a value determined according to the forward gear state or the rearward gear state of the transmission is +1 in case of a forward gear and −1 in case of a rearward gear.

* * * * *